United States Patent
Satou et al.

(10) Patent No.: US 7,973,811 B2
(45) Date of Patent: Jul. 5, 2011

(54) DISPLAY DEVICE

(75) Inventors: Ichirou Satou, Kyoto (JP); Iori Kuwano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1013 days.

(21) Appl. No.: 11/813,575

(22) PCT Filed: Jan. 23, 2006

(86) PCT No.: PCT/JP2006/300971
§ 371 (c)(1),
(2), (4) Date: Jul. 9, 2007

(87) PCT Pub. No.: WO2006/080277
PCT Pub. Date: Aug. 3, 2006

(65) Prior Publication Data
US 2009/0021459 A1    Jan. 22, 2009

(30) Foreign Application Priority Data

Jan. 25, 2005   (JP) .................................. 2005-016910

(51) Int. Cl.
*G09G 5/02* (2006.01)
(52) U.S. Cl. ........................... 345/695; 345/87; 345/103
(58) Field of Classification Search .................. 345/87, 345/694, 695, 696, 103
See application file for complete search history.

(56) References Cited

U.S. PATENT DOCUMENTS

| | | | | |
|---|---|---|---|---|
| 5,751,272 A | * | 5/1998 | Silverbrook et al. | 345/694 |
| 5,808,594 A | * | 9/1998 | Tsuboyama et al. | 345/89 |
| 6,014,121 A | * | 1/2000 | Aratani et al. | 345/89 |
| 6,515,643 B1 | * | 2/2003 | Kamiko et al. | 345/87 |
| 6,529,257 B1 | | 3/2003 | Nakano | |
| 6,909,413 B2 | * | 6/2005 | Nanno et al. | 345/87 |
| 6,965,365 B2 | * | 11/2005 | Nakamura | 345/87 |
| 7,084,848 B2 | * | 8/2006 | Senda et al. | 345/92 |
| 7,505,053 B2 | * | 3/2009 | Brown Elliott et al. | 345/694 |
| 7,515,122 B2 | * | 4/2009 | Miller et al. | 345/76 |
| 2002/0012077 A1 | | 1/2002 | Fukami et al. | |
| 2002/0033925 A1 | * | 3/2002 | Ito | 349/145 |
| 2002/0075211 A1 | * | 6/2002 | Nakamura | 345/87 |
| 2004/0085273 A1 | * | 5/2004 | Kikuchi et al. | 345/87 |
| 2006/0055713 A1 | * | 3/2006 | Asao et al. | 345/690 |

FOREIGN PATENT DOCUMENTS

| | | |
|---|---|---|
| EP | 1130568 | 9/2001 |
| JP | 2000-180880 | 6/2000 |
| JP | 2003-162236 | 6/2003 |
| JP | 2003-228040 | 8/2003 |

* cited by examiner

*Primary Examiner* — Lun-Yi Lao
*Assistant Examiner* — Tom V Sheng
(74) *Attorney, Agent, or Firm* — Pearne & Gordon LLP (57) ABSTRACT

An object of the present invention is to lessen a user's feeling that something is wrong when a user watches a display device configured by rectangular pixels. In a display device of the present invention includes a display portion on which a plurality of pixels are arranged in matrix, the display portion has areas configured by rectangular pixels and areas configured by square pixels.

2 Claims, 9 Drawing Sheets

FIG. 2

X′/X = 1/cos α

DISPLAY DEVICE

TECHNICAL FIELD

The present invention relates to a display device installed into a mobile terminal.

BACKGROUND ART

In order to display various information such as characters, images, moving pictures, etc. clearly and improve visibility, an enlargement of a display area is required recently of a display device such as a liquid crystal display device, or the like used in a mobile communication terminal such as a cellular phone terminal, PDA, or the like.

Therefore, there is the display device in which a display area is enlarged by modifying the standard resolution of the display device to add the pixels in several rows or several columns. For example, as the liquid crystal display device installed into the cellular phone terminal, there is the liquid crystal display device in which the normal resolution 240× 320 (QVGA) is modified into 240×345.

In this case, in compliance with the modified resolution, a hardware such as a display controller, or the like must be changed and also a software regarding the display device in the cellular phone terminal must be changed. Thus, a cost is increased.

Figure 7:
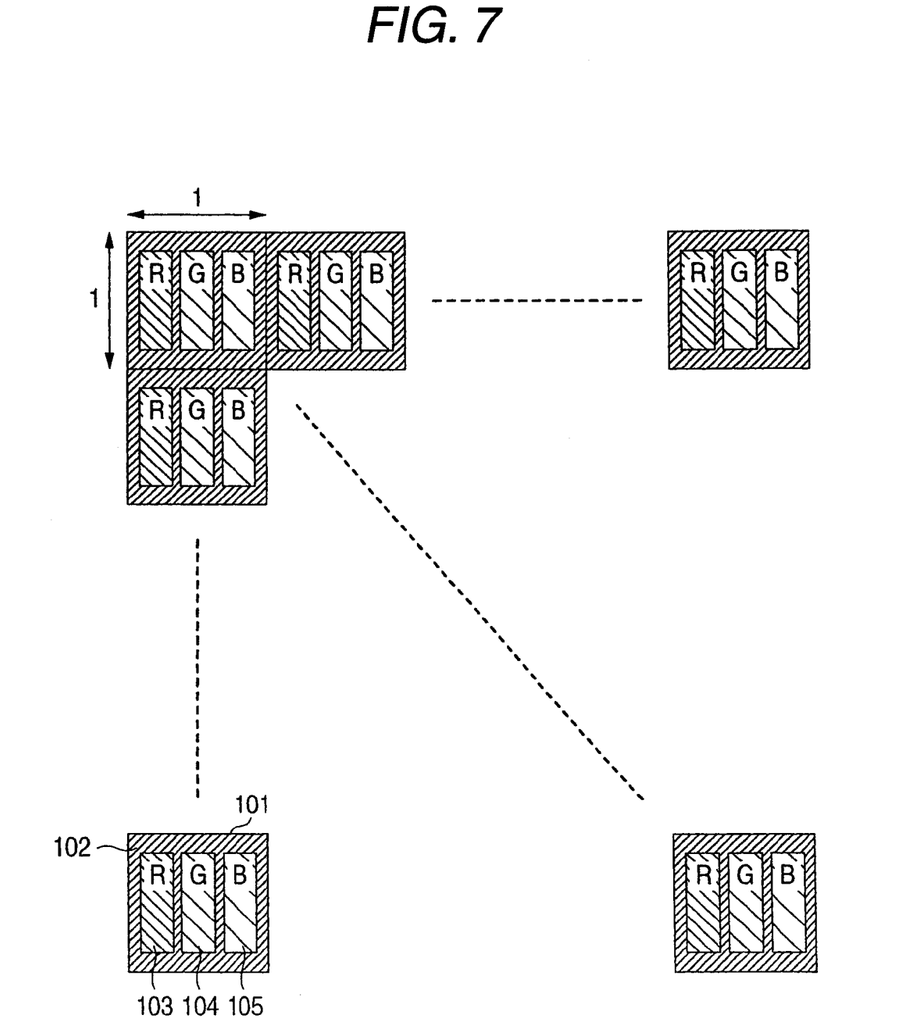
FIG. 7 A schematic view of a pixel configuration of a display device in the prior art (an aspect ratio of a pixel is 1 to 1).

Meanwhile, there is the display device in which a display area is enlarged without change of the resolution. Normally, as shown in FIG. 7, square pixels are aligned in matrix on the display device. Also, normally the square pixels are divided three parts of red, blue, green (RGB) respectively in the color display device.

Figure 8:
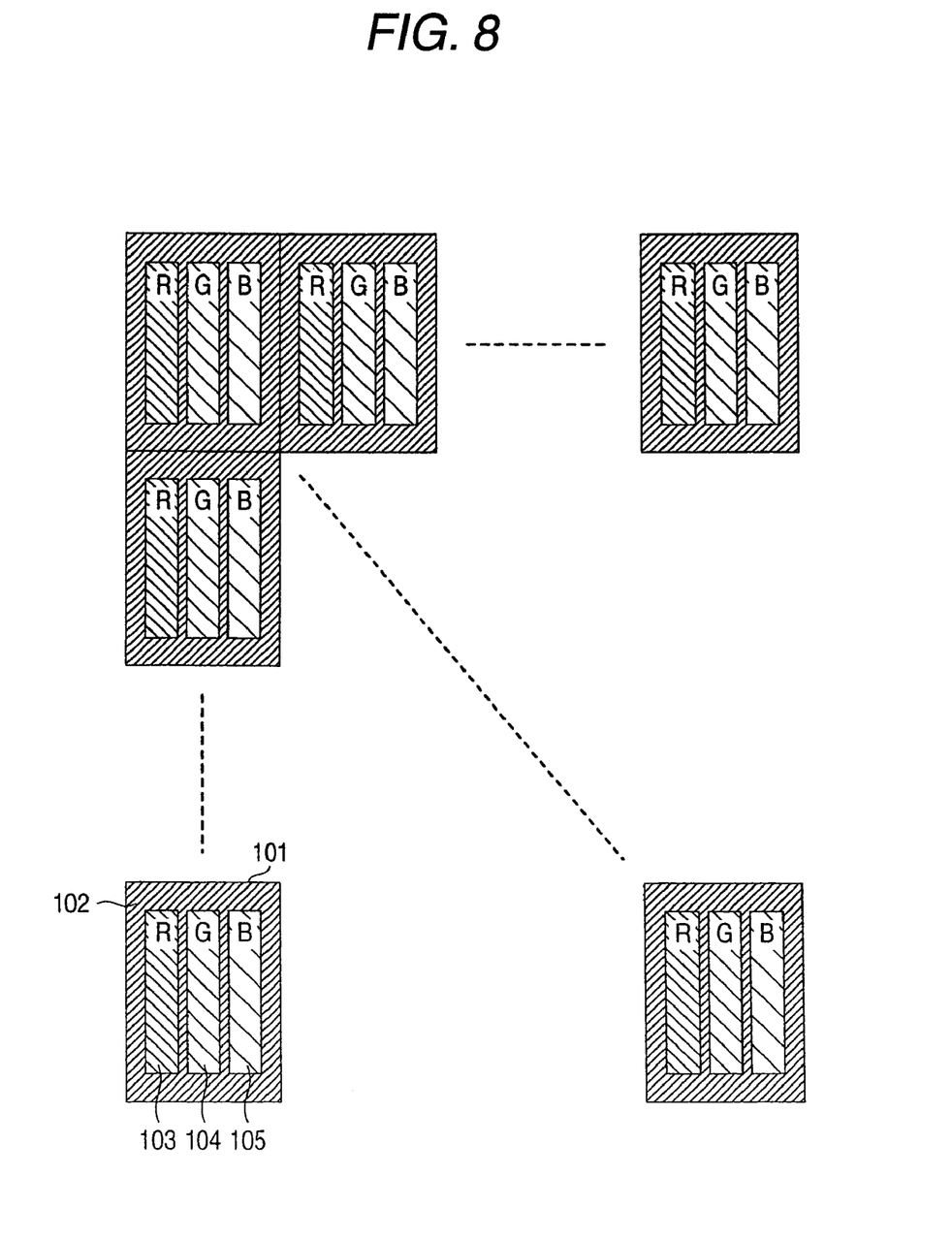
FIG. 8 A schematic view of a pixel configuration of a display device in the prior art (an aspect ratio of a pixel is 1 to 1.1).

In contrast, in order to enlarge the display area, as shown in FIG. 8, the liquid crystal display device on which pixels whose aspect ratio is different from 1 to 1 (e.g., rectangular pixels whose aspect ratio is 1 to 1.04) are aligned in matrix has been proposed (Patent Literature 1).

Patent Literature 1: JP-A-2000-180880

DISCLOSURE OF THE INVENTION

Problems that the Invention is to Solve

Figure 9:
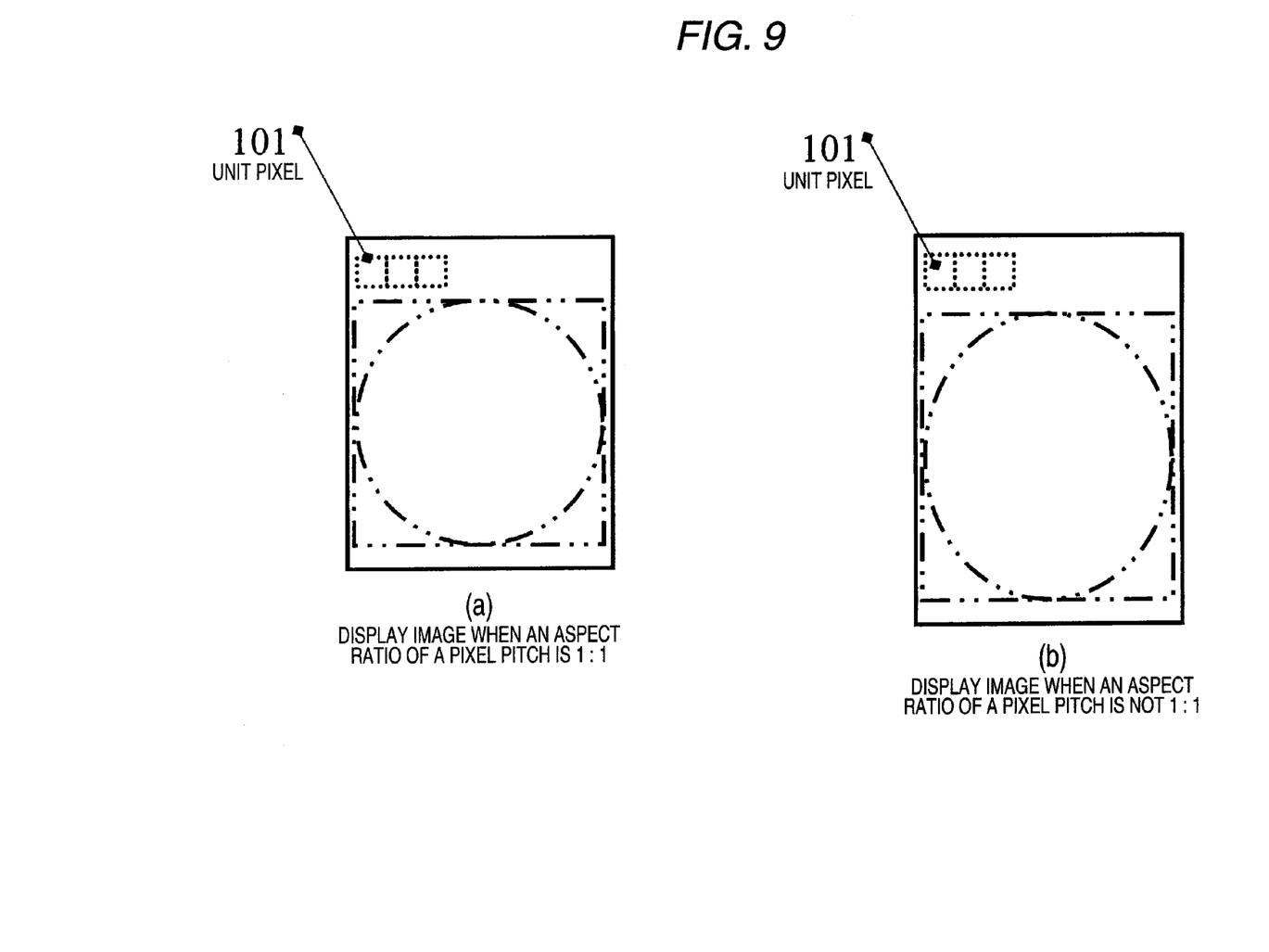
FIG. 9 A view explaining a problem in the prior art.

However, in the liquid crystal display device shown in FIG. 8, a displayed image is distorted in some cased since all pixels have a rectangular shape respectively. For example, as shown in FIG. 9(a), in the display device in which all pixels are configured by the rectangular pixels, the image that is to be displayed as a circle in the display device, all pixels of which are configured by square pixels, is displayed as an ellipse, as shown in FIG. 9(b). Thus, sometimes the user feels something strange about the image.

It is an object of the present invention to lessen a user's feeling that something is wrong when a user watches a display device configured by rectangular pixels.

Means for Solving the Problems

A display device of the present invention includes a display portion on which a plurality of pixels are arranged in matrix; wherein the display portion has areas configured by rectangular pixels and areas configured by square pixels.

According to this configuration, the overall display portion is not configured by the rectangular pixels, but a part of the areas is configured by the rectangular pixels and remaining areas are configured by the square pixels. Therefore, a distortion of the overall image can be reduced even when one image is displayed on the whole display portion, and the user's feeling that something is wrong can be lessened.

Also, in the display device of the present invention, at least one line on both upper and lower ends of the display portion is configured by the rectangular pixels.

According to this configuration, only the limited areas on the upper and lower ends are configured by the rectangular pixels. Therefore, it is difficult for the user to sense that the pixels whose aspect ratio is different respectively are present in the display portion.

Also, in the display device of the present invention, an area of opening portions of the rectangular pixels is equal to an area of opening portions of the square pixels.

According to this configuration, a quantity of transmitted light through the rectangular pixels becomes equal to a quantity of transmitted light through the square pixels. Therefore, it is difficult for the user to sense that the pixels whose aspect ratio is different respectively are present in the display portion.

Also, in the display device of the present invention, the display portion is formed of a liquid crystal device, at least one line on both upper and lower ends of the display portion is configured by the rectangular pixels, and a reflecting performance of the rectangular pixels is set higher than a reflecting performance of the square pixels.

According to this configuration, a reflected light of an external light can be utilized much more in the limited areas on the upper and lower ends.

Therefore, a power consumed to lightening the backlight can be reduced. Also, in the environment where an external light can be utilized, the areas on the upper and lower ends can be displayed in a situation that the backlight is turned off.

Also, in the display device of the present invention, the display portion is formed of a liquid crystal device, and a storage capacity for holding a pixel voltage is provided to every the plurality of pixels, and areas of the opening portions of the plurality of pixels are set equal by a capacity of the storage capacity.

According to this configuration, a quantity of transmitted light through the rectangular pixels becomes equal to a quantity of transmitted light through the square pixels. Therefore, it is difficult for the user to sense that the pixels whose aspect ratio is different respectively are present in the display portion. In addition, the writing period can be slowed only in the pixels whose storage capacity is increased, and thus an electric power required to display the information of the image, and the like can be reduced in the areas configured by the rectangular pixels.

Also, a cellular phone terminal of the present invention includes at least one of display devices mentioned above.

According to this configuration, a display area of the display device of the cellular phone terminal can be enlarged.

Also, in the cellular phone terminal of the present invention, a display area configured by the rectangular pixels displays information regarding a state of the cellular phone terminal or information for guiding an operation of the cellular phone terminal.

According to this configuration, an electric power required for displaying the information of the information regarding the condition of the cellular phone terminal or the information guiding the operations of the cellular phone terminal can be reduced.

Advantages of the Invention

According to the present invention, a user's feeling that something is wrong can be lessened when the user watches a display device configured by rectangular pixels. Also, since the foregoing attached function is provided to the rectangular pixel, power consumption can be reduced.

DESCRIPTION OF REFERENCE NUMERALS 101 unit pixel
102 shading area
103 opening portion of a red subpixel
104 opening portion of a green subpixel
105 opening portion of a blue subpixel
106 area configured by square pixels
107 area configured by rectangular pixels
108 pixel whose aspect ratio is 1:1 (square pixel)
109 pixel whose aspect ratio is 1:1.1 (rectangular pixel)
201 human eye
202 display surface of a display device
203 pixel of an outer peripheral portion
204 pixel of a center portion
205 visual angle (α)
301 operation information display portion of a terminal
302 battery mark
303 message mark
304 antenna mark
305 operation guidance display portion of a terminal
306 operation guidance display
307 operation guidance display
308 operation guidance display
309 any information display portion
501 opening portion of a split red subpixel
502 opening portion of a split green subpixel
503 opening portion of a split blue subpixel

BEST MODE FOR CARRYING OUT THE INVENTION

Embodiments of the present invention will be explained with reference to the drawings hereinafter.

Embodiment 1

Figure 1:
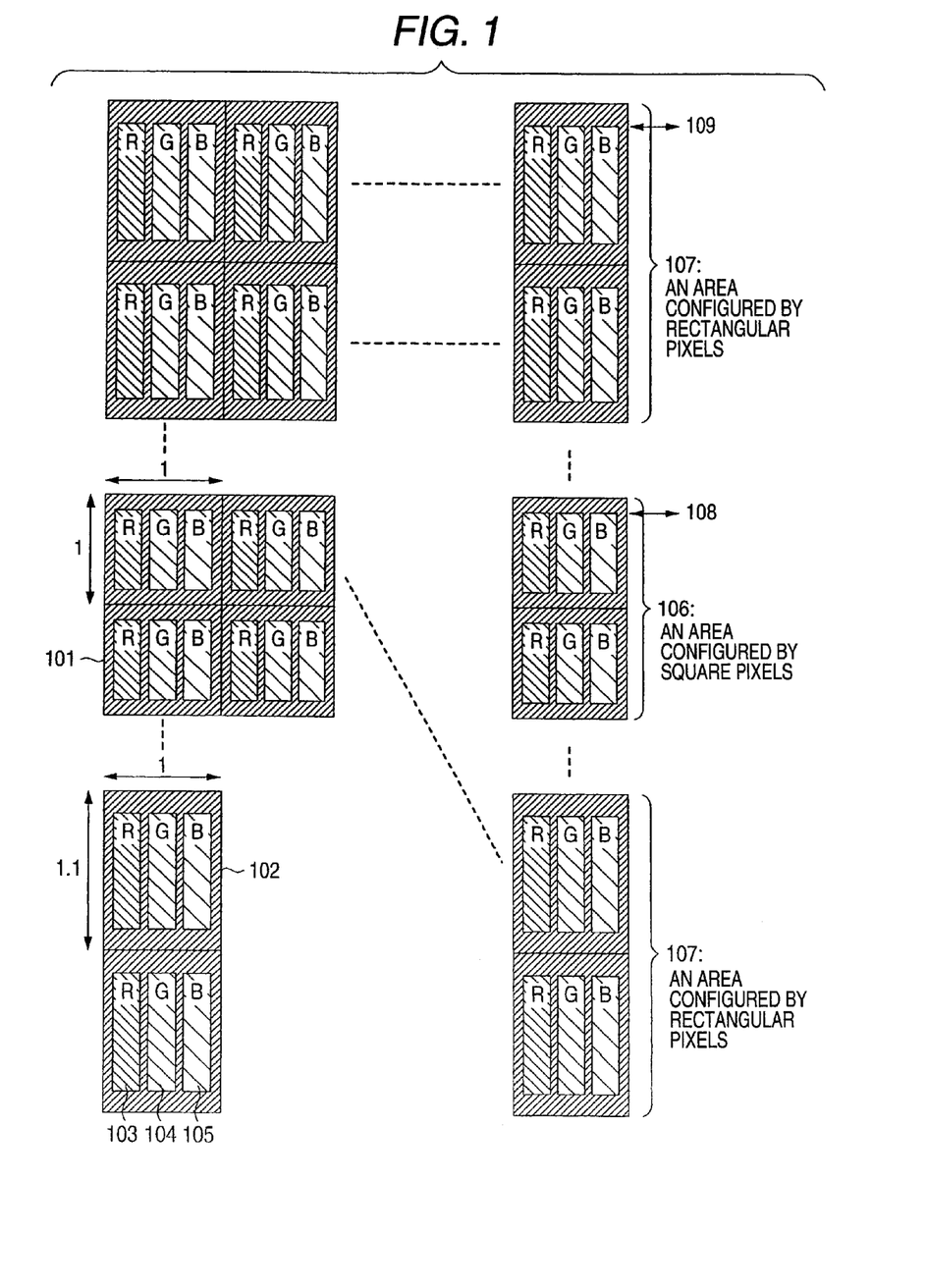
FIG. 1 A schematic view of a display device in Embodiment 1 of the present invention.
Figure 2:
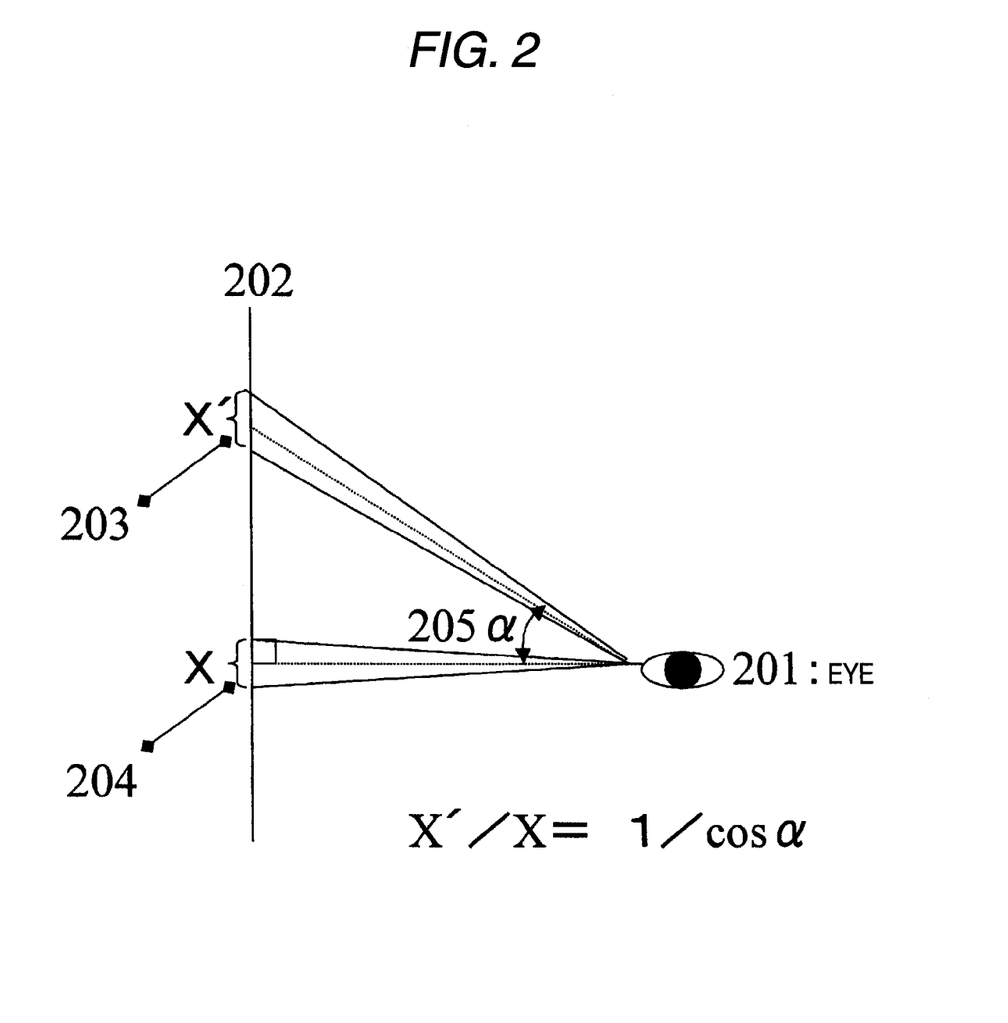
FIG. 2 A view explaining a relationship between a visual angle and an aspect ratio of a pixel.

FIG. 1 is a schematic view of a display device in Embodiment 1 of the present invention. FIG. 2 is a view explaining a relationship between a visual angle and an aspect ratio of a pixel.

In FIG. 1, a display portion of the display device of Embodiment 1 has a plurality of unit pixels 101 that are aligned in matrix. The unit pixel 101 has a shading area 102 for concealing lines, etc., an opening portion 103 of a red subpixel, an opening portion 104 of a green subpixel, and an opening portion 105 of a blue subpixel. A color display can be accomplished by the opening portion 103 of the red subpixel, the opening portion 104 of the green subpixel, and the opening portion 105 of the blue subpixel.

Also, as the unit pixel 101, there are two types of pixels, one of which is a pixel 108 whose aspect ratio is 1:1 (square pixel) and the other of which is a pixel 109 whose aspect ratio is 1:1.1 (rectangular pixel). Both upper and lower end portions of the display portion are constructed by areas 107 each configured by the rectangular pixels, and the center portion is constructed by areas 106 each configured by the square pixels.

Here, an aspect ratio of the pixel is not limited to the aspect ratio illustrated herein, and also the locations in which respective pixels are aligned are not limited to those illustrated herein. It is the gist of the present embodiment that two types or more of differently shaped pixels exist in the display portion of the display device.

As described above, not all areas of the display portion are composed by the rectangular pixels, but some areas of the display portion formed by the areas 107 configured by the rectangular pixels and the other areas formed by the areas 106 configured by the square pixels. Therefore, a distortion of the image caused when all pixels are configured by the rectangular pixels can be lessened, and thus it becomes difficult for the user to sense a distortion. As a result, the user can view the information displayed on the display portion without an uncomfortable feeling.

Also, when the present invention is applied to the display device that needs a plane light source such as a backlight, or the like, e.g., the liquid crystal display device, the better advantage can be achieved.

As the backlight, a plane light source is artificially realized by aligning a plurality of line light sources such as CCFL, or the like or a plurality of point light sources such as LED, or the like and using a light guide plate, or the like. Therefore, a brightness is not perfectly uniform over the backlight, and the backlight has somewhat a brightness gradient.

At this time, it is common in the optical design of the backlight that the light is made bright in the center portion and the light is dimmed in the end portions. Therefore, like the present invention, when both upper and lower end portions or the outer peripheral portions of the display portion are constructed by the rectangular pixels whereas the center portion is constructed by the square pixels, such an advantage can be achieved that a brightness gradient of the overall backlight can be reduced because the rectangular pixel has a larger aperture ratio than the square pixel.

For example, as shown in FIG. 2, when the human being watches the images displayed on a display surface 202 of the display device, a pixel 203 of an outer peripheral portion is seen smaller than a pixel 204 of a center portion because of a visual angle α (an angle between two straight lines connecting a human eye 201 and both ends of the object respectively). Therefore, a shape of the pixel is changed stepwise from the center portion so as to satisfy a relationship between X' (longitudinal length of the pixel in the outer peripheral portion), X (longitudinal length of the pixel in the center portion), and a visual angle α given by Eq. (1).

[Formula 1]

$$X'/X = 1/\cos \alpha \qquad \text{Eq. (1)}$$

According to this configuration, as shown in FIG. 2, the longitudinal lengths of X' and X can be made apparently equal when the display surface is viewed from the center portion of the display surface. Therefore, it is possible to make it difficult for the user to sense that plural pixels having a different shape respectively are present.

In this case, explanation is made herein of the longitudinal length of the pixel. But this explanation is similarly true of the lateral length of the pixel.

Embodiment 2

Figure 3:
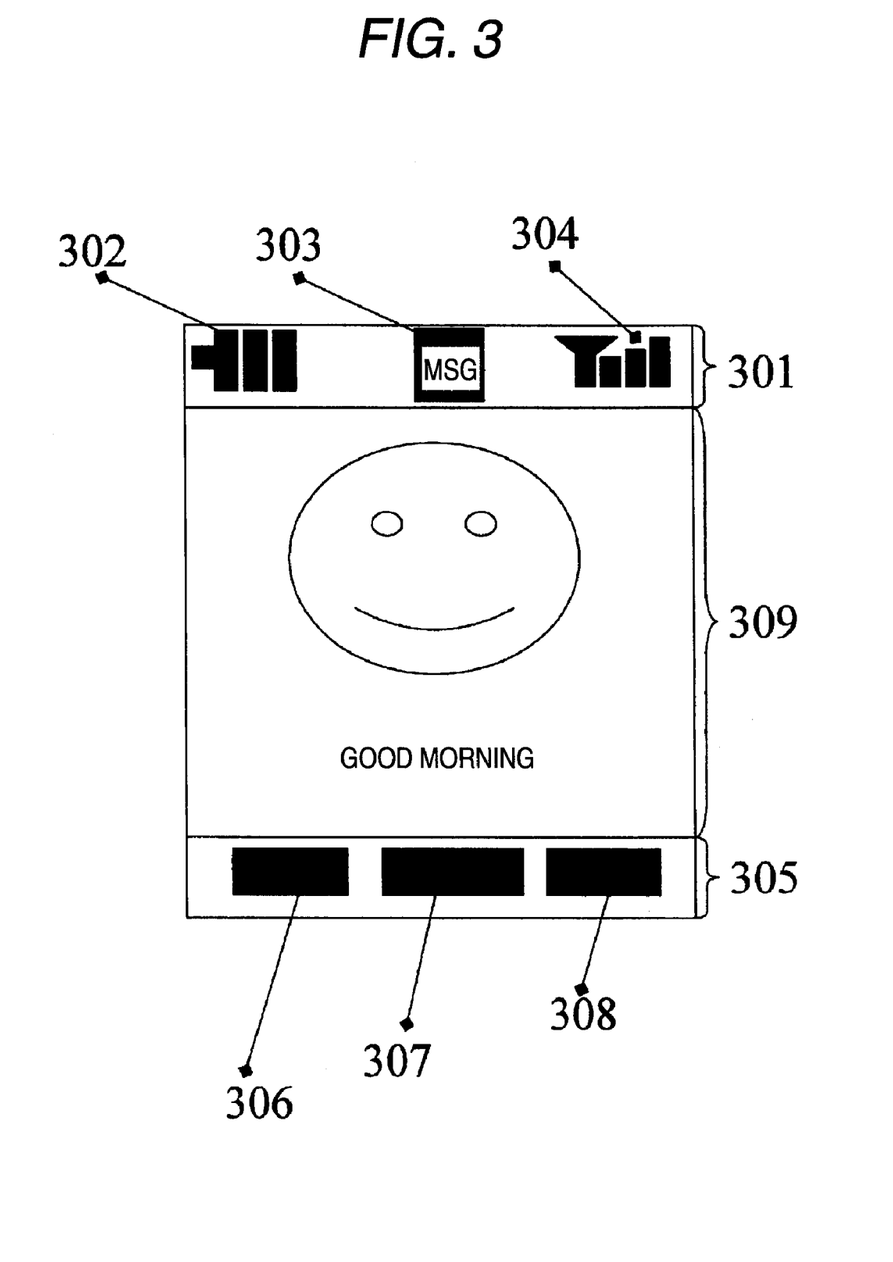
FIG. 3 An example of a screen displayed on a liquid crystal display device installed into a cellular phone terminal in Embodiment 2 of the present invention.

FIG. 3 is an example of a screen displayed on a liquid crystal display device installed into a cellular phone terminal in Embodiment 2 of the present invention.

The display portion of the liquid crystal display device is constructed by an operation information display portion 301 of the terminal, an any information display portion 309, and an operation guidance display portion 305 of the terminal. The operation information display portion 301 is configured by the rectangular pixels, and displays the operation information of the terminal such as a battery mark 302, a message mark 303, an antenna mark 304, and the like.

The any information display portion 309 is configured by the square pixels.

The operation guidance display portion 305 of the terminal is configured by the rectangular pixels, and displays an operation guidance display 306, an operation guidance display 307, and an operation guidance display 308.

Normally, the information such as the battery mark 302, the message mark 303, the antenna mark 304, the operation guidance display 306, etc., whose frequency in use is high, are displayed on both upper and lower end portions of the display portion of the liquid crystal display device installed into the cellular phone terminal. There is small chance of displaying character data or image data such as the mail, the phone book, or the like both upper and lower end portions. Therefore, the user has very little chance to sense the fact that a shape of the pixels on the operation information display portion 301 and the operation guidance display portion 305 of the terminal and a shape of the pixels on the any information display portion 309 are different mutually, and thus it is difficult for the user to sense such fact.

Also, the display data such as the battery mark 302, the message mark 303, the antenna mark 304, the operation guidance display 307, the operation guidance display 308, and the like, which are normally displayed on the upper and lower end portions of the display portion, may be processed beforehand to fit in with the rectangular pixel. As a result, it is possible for the user to make it difficult to sense the fact that the shape of the pixels on the operation information display portion 301 and the operation guidance display portion 305 of the terminal and the shape of the pixels on the any information display portion 309 are different mutually.

Embodiment 3

Figure 4:
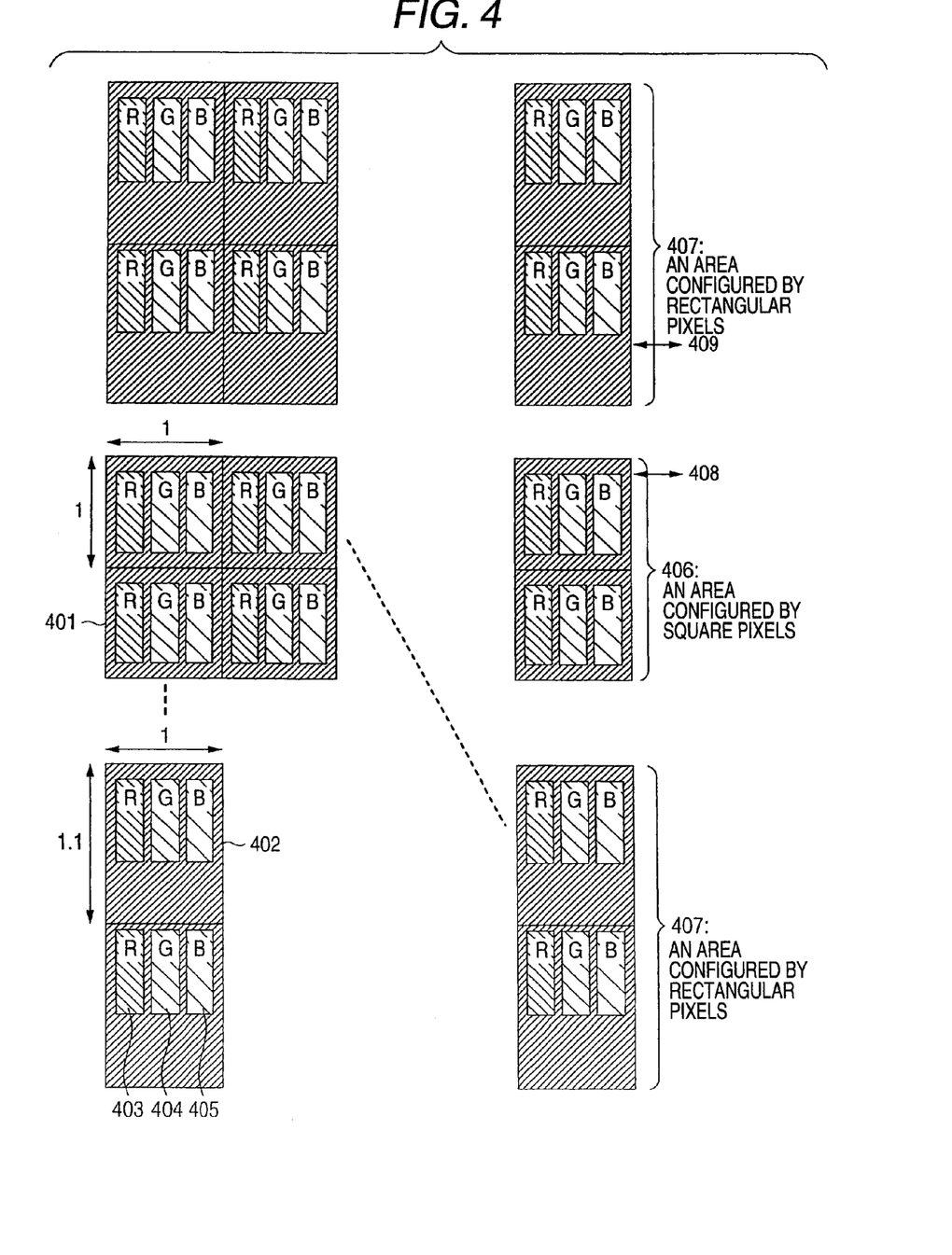
FIG. 4 A schematic view of a display device in Embodiment 3 of the present invention.
Figure 5:
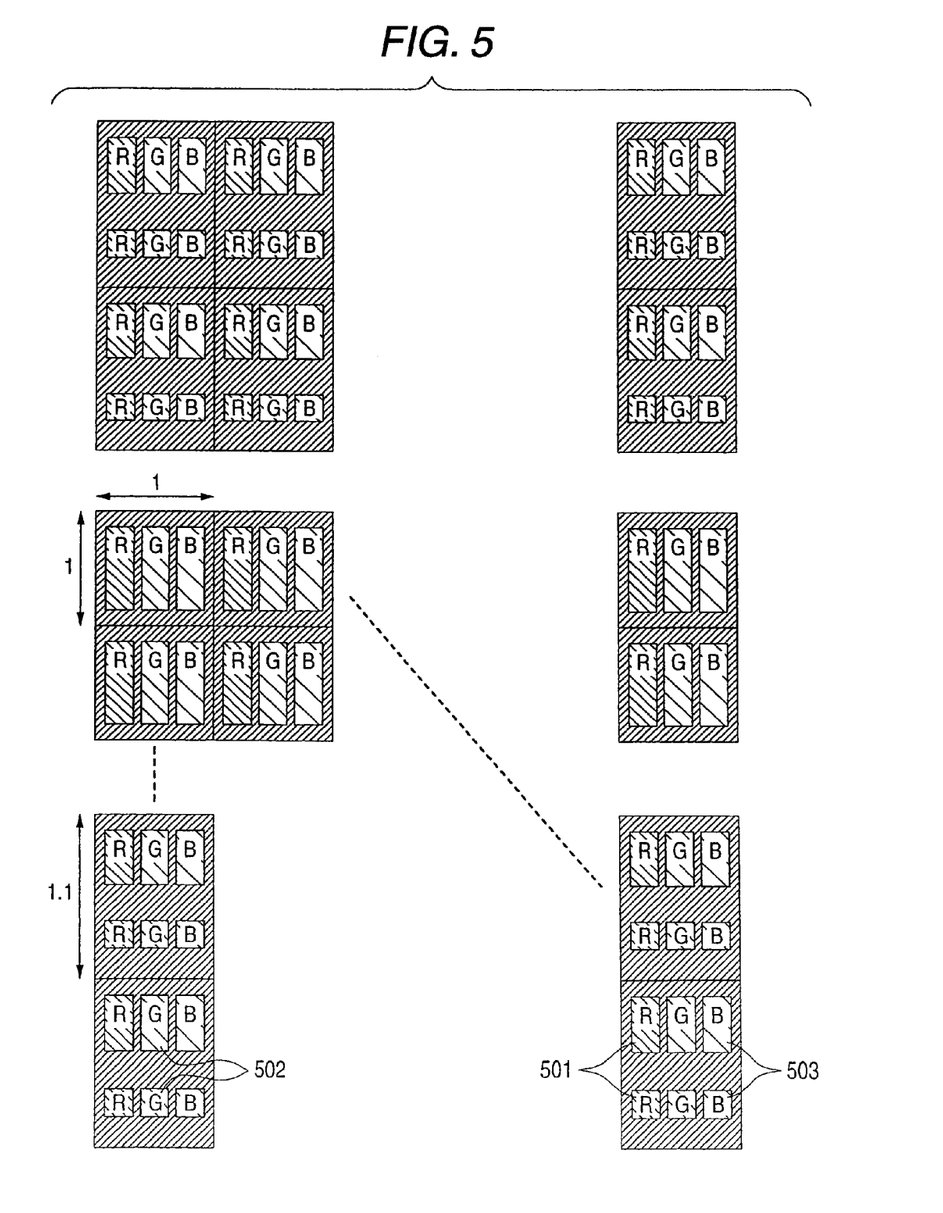
FIG. 5 A view showing a variation of an opening shape of a rectangular pixel in Embodiment 3 of the present invention.

FIG. 4 is a schematic view of a display device in Embodiment 3 of the present invention. FIG. 5 is a view showing a variation of an opening shape of a rectangular pixel in Embodiment 3 of the present invention.

In FIG. 4, a display portion of the display device in Embodiment 3 has a plurality of unit pixels 402 that are aligned in matrix. The unit pixel 402 has a shading area 402 for concealing lines, etc., an opening portion 403 of a red subpixel, an opening portion 404 of a green subpixel, and an opening portion 405 of a blue subpixel. A color display can be given by the opening portion 403 of the red subpixel, the opening portion 404 of the green subpixel, and the opening portion 405 of the blue subpixel.

Also, as the unit pixel 101, there are a pixel 408 whose aspect ratio is 1:1 (square pixel) and a pixel 409 whose aspect ratio is 1:1.1 (rectangular pixel). Both upper and lower end portions of the display portion are constructed by areas 407 each configured by the rectangular pixels, and the center portion is constructed by areas 406 each configured by the square pixels.

As shown in FIG. 4, in Embodiment 3, areas of the opening portions of the square pixels and areas of the opening portions of the rectangular pixels are set equal mutually in the opening portion 403 of the red subpixel, the opening portion 404 of the green subpixel, and the opening portion 405 of the blue subpixel respectively. Therefore, when the backlight, or the like emits a uniform plane light, a quantity of transmitted light becomes equal on the overall pixels of the display surface and thus the brightness can be set uniformly.

FIG. 5 shows a variation of the shape of the opening portion of the rectangular pixel in Embodiment 3 of the present invention. In the rectangular pixels shown in FIG. 5, an opening portion 501 of a red subpixel, an opening portion 502 of a green subpixel, and an opening portion 503 of a blue subpixel are split into two parts respectively. Although their shapes of the opening portions of the rectangular pixels are different from the shapes of the opening portions of the square pixels, total areas of respective opening portions are equal to each other. Therefore, a quantity of transmitted light from respective pixels of the display portion is equal and thus the brightness can be set uniformly. In other words, if the area of the opening portion is set equal, the same effect can be attained even though the shape of the opening portion is changed.

Embodiment 4

Figure 6:
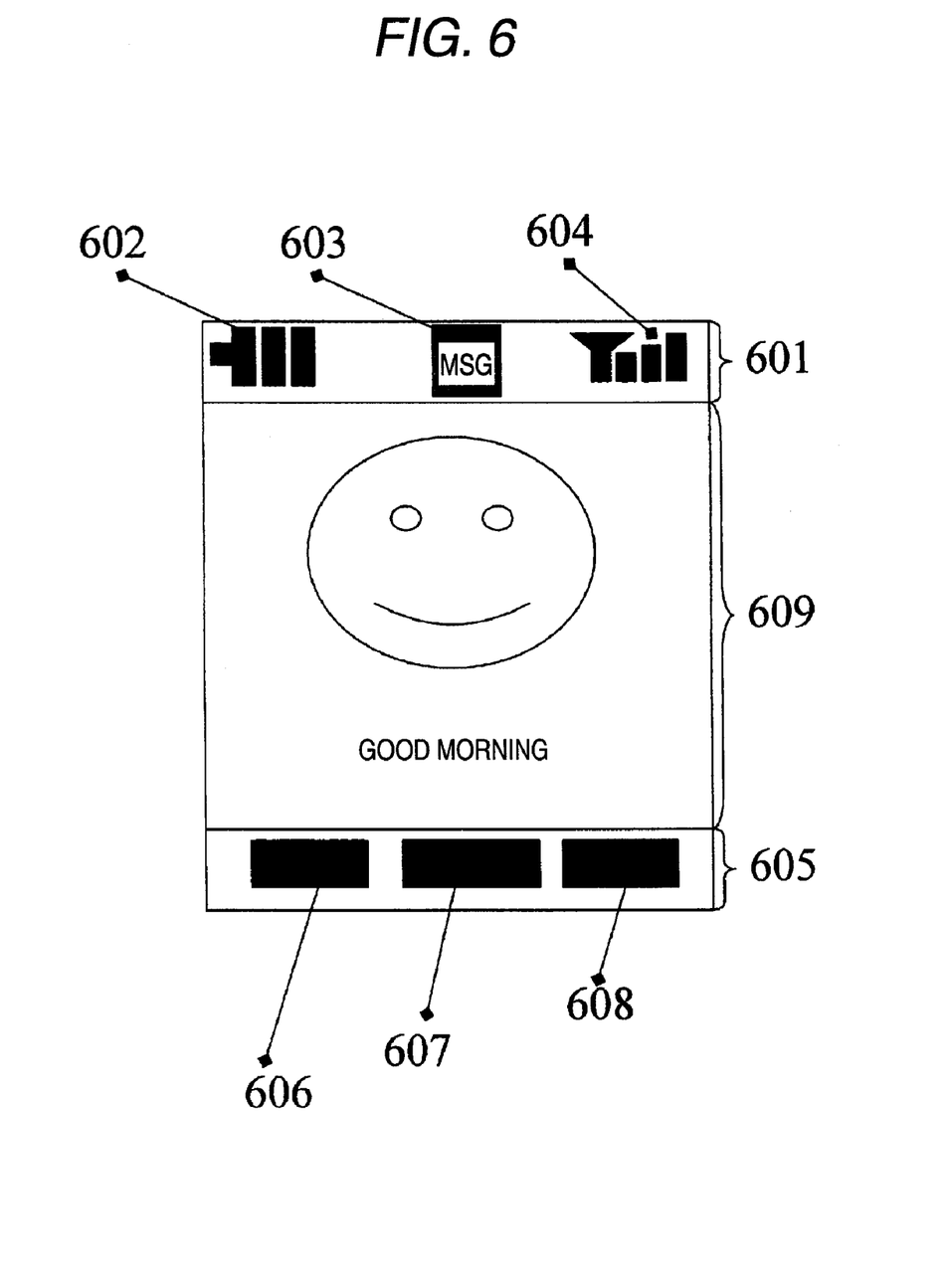
FIG. 6 An example of a screen displayed on a liquid crystal display device installed into a cellular phone terminal in Embodiment 4 of the present invention.

FIG. 6 is an example of a screen displayed on a liquid crystal display device installed into a cellular phone terminal in Embodiment 4 of the present invention.

The display portion in Embodiment 4 is constructed by an operation information display portion 601 of the terminal, an any information display portion 609, and an operation guidance display portion 605 of the terminal. The operation information display portion 601 is configured by the rectangular pixels, and displays the operation information of the terminal such as a battery mark 602, a message mark 603, an antenna mark 604, and the like.

The any information display portion 609 is configured by the square pixels.

The operation guidance display portion 605 of the terminal is configured by the rectangular pixels, and displays an operation guidance display 606, an operation guidance display 607, and an operation guidance display 608.

In Embodiment 4, in order to set a reflecting performance of respective areas of the operation information display portion 601 of the terminal and the operation guidance display portion 605 of the terminal higher than that of the area of the any information display portion 609, an area of a reflection electrode in the rectangular pixel is designed larger than that of a reflection electrode in the square pixel. For example, a reflectance of the area of the operation information display portion 601 of the terminal and the area of the operation guidance display portion 605 of the terminal is set to 2%, and a reflectance of the area of the any information display portion 609 is set to 0%.

According to this configuration, the user can view the operation information of the terminal and the information regarding the operation guidance of the terminal even in a situation that the display portion is in the direct sunlight or the backlight is turned off.

Also, power consumption may be reduced by increasing a storage capacity of the area configured by the rectangular pixels and setting the rewriting period (e.g., 20 [Hz]) in this area slower than the rewriting period (e.g., 60 [Hz]) in the normal use condition. At this time, the reflecting performance and the storage capacity can be increased simultaneously by using the electrode forming a storage capacity and the reflection electrode commonly.

Also, when an optical sensor, or the like is provided to each pixel and the display device can automatically adjust the brightness to meet a line scanner or a luminance in use, a quantity of transmitted light may be kept by providing the above function to a part of the pixels on the display portion. The embodiment explained as above is concerned with the color display. But the present invention can be applied similarly to the monochromatic display device.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2005-016910) filed on Jan. 25, 2005; the entire contents of which are incorporated herein by reference.

Industrial Applicability

The display device of the present invention possesses such an advantage that a distortion of the image displayed on the display device can be lessened, and is useful as the display device installed into the mobile communication terminal such as the cellular phone, the PDA (Personal Digital Assistant), and the like.

The invention claimed is:
1. A display device, comprising:
a display portion on which a plurality of pixels are arranged in matrix,
wherein the display portion has areas configured by rectangular pixels and areas configured by square pixels; and
wherein an area of an opening portion of each of the rectangular pixels is equal to an area of an opening portion of each of the square pixels,
wherein the display portion is formed of a liquid crystal device;
wherein at least one line on both upper and lower ends of the display portion is configured by the rectangular pixels; and
wherein a reflecting performance of the rectangular pixels is set higher than a reflecting performance of the square pixels.
2. A display device comprising:
a display portion on which a plurality of pixels are arranged in matrix,
wherein the display portion has areas configured by rectangular pixels and areas configured by square pixels;
wherein an area of an opening portion of each of the rectangular pixels is equal to an area of an opening portion of each of the square pixels;
wherein the display portion is formed of a liquid crystal device; and
wherein a storage capacity for holding a pixel voltage is provided to each of the plurality of pixels, and the storage capacity for each of the plurality of pixels is set corresponding to the areas of the opening portions of the plurality of pixels including the rectangular pixels and the square pixels so that a quantity of transmitted light through the rectangular pixels becomes equal to a quantity of transmitted light through the square pixels.

* * * * *